US012760909B1

(12) United States Patent
Galarza

(10) Patent No.: US 12,760,909 B1
(45) Date of Patent: Oct. 13, 2026

(54) BRICK OVEN PIZZA TRUCK BED ASSEMBLY

(71) Applicant: Jonathan Galarza, Oakland, CA (US)

(72) Inventor: Jonathan Galarza, Oakland, CA (US)

( * ) Notice: Subject to any disclaimer, the term of this patent is extended or adjusted under 35 U.S.C. 154(b) by 0 days.

(21) Appl. No.: 18/739,266

(22) Filed: Jun. 10, 2024

(51) Int. Cl.
*F24C 15/30* (2006.01)
*B60P 3/025* (2006.01)
*B60P 7/08* (2006.01)

(52) U.S. Cl.
CPC ............ *F24C 15/30* (2013.01); *B60P 3/0257* (2013.01); *B60P 7/0807* (2013.01)

(58) Field of Classification Search
CPC ........ F24C 15/30; B60P 3/0257; B60P 7/0807
USPC ............................................................ 108/44
See application file for complete search history.

(56) References Cited

U.S. PATENT DOCUMENTS

| | | | | |
|---|---|---|---|---|
| 2,867,471 A * | 1/1959 | Coon, Jr. | B60P 3/36 | 126/91 A |
| 4,705,315 A * | 11/1987 | Cherry | B60R 11/06 | 312/334.33 |
| 4,824,158 A * | 4/1989 | Peters | B60R 5/04 | 414/522 |
| 5,052,878 A * | 10/1991 | Brockhaus | B60P 1/003 | 224/403 |
| 5,090,335 A * | 2/1992 | Russell | B60P 1/433 | 224/403 |
| 5,533,771 A * | 7/1996 | Taylor | B60P 1/435 | 296/61 |
| 6,244,646 B1 * | 6/2001 | Wheeler, III | B60R 5/04 | 414/522 |
| 6,698,634 B2 * | 3/2004 | Thomson | E04H 15/06 | 224/404 |
| 6,860,536 B1 * | 3/2005 | Schimunek | B60R 13/01 | 296/37.6 |
| 7,083,219 B1 * | 8/2006 | Gregory | B60P 1/003 | 414/522 |
| 8,240,527 B1 * | 8/2012 | Casselton | B60R 9/065 | 224/404 |
| 9,435,546 B2 * | 9/2016 | Galatte | F24C 15/08 | |
| 11,584,310 B2 * | 2/2023 | Cooper | B60P 3/34 | |
| 12,311,825 B1 * | 5/2025 | Wang | B60P 3/36 | |
| 2008/0083352 A1 * | 4/2008 | Tovani | A47B 83/04 | 108/44 |
| 2014/0261098 A1 * | 9/2014 | Giemza | B65G 69/24 | 108/44 |

(Continued)

*Primary Examiner* — Daniel J Rohrhoff
(74) *Attorney, Agent, or Firm* — University of San Francisco School of Law; Amir V. Adibi; Mark Dickson

(57) ABSTRACT

An oven support sliding assembly has a fixed lower structure and a sliding upper structure. The sliding upper structure supports an oven and slides along the fixed lower structure. The fixed lower structure attaches to a truck bed. For example, the oven is bolted to the sliding upper structure and the fixed lower structure is bolted to the truck bed. The assembly allows an oven to be easily stored within a vehicle while protected from an external environment and allows the oven to slide out of the vehicle during use. In one embodiment, the sliding upper structure has an upper frame and oven mounting holes, and the fixed lower structure has a lower frame, truck mounting holes, and a lower crossbar. The upper lateral track surfaces slide along the lower lateral track surfaces in a parallel fashion. A handle, release lever, and locking mechanism secure the assembly in various states.

14 Claims, 11 Drawing Sheets

PERSPECTIVE VIEW OF OVEN MOUNTED ON OVEN SUPPORT SLIDING ASSEMBLY

TOP VIEW OF OVEN SUPPORT SLIDING ASSEMBLY
(FULLY EXTENDED)

(56) References Cited

U.S. PATENT DOCUMENTS

2024/0123888 A1 * 4/2024 Gillette .................... B60N 3/16

* cited by examiner

OVEN SUPPORT SLIDING ASSEMBLY MOUNTED ON TRUCK BED

PERSPECTIVE VIEW OF OVEN MOUNTED ON OVEN SUPPORT SLIDING ASSEMBLY

FRONT VIEW OF OVEN MOUNTED ON OVEN SUPPORT SLIDING ASSEMBLY

TOP VIEW OF OVEN SUPPORT SLIDING ASSEMBLY (FULLY RETRACTED)

TOP VIEW OF OVEN SUPPORT SLIDING ASSEMBLY
(FULLY EXTENDED)

UPPER AND LOWER
LATERAL TRACKS

PERSPECTIVE VIEW OF OVEN SUPPORT SLIDING ASSEMBLY
(FULLY EXTENDED)

REAR VIEW OF OVEN SUPPORT
SLIDING ASSEMBLY
(FULLY EXTENDED)

OPERATOR ENGAGING RELEASE LEVER
(PRIOR TO ACTIVATION)

OPERATOR ENGAGING RELEASE LEVER

LOCKING DEVICE

OVERVIEW

INSTALLING OVEN SUPPORT SLIDING ASSEMBLY

BRICK OVEN PIZZA TRUCK BED ASSEMBLY

TECHNICAL FIELD

The present invention relates generally to cooking appliances, and more specifically, to oven equipment.

BACKGROUND INFORMATION

Brick oven pizzas have a rich history dating back centuries to ancient civilizations such as the Greeks and Romans. These pizzas are renowned for their distinctive flavor and texture, owing to the unique cooking method employed in brick ovens. Traditionally, brick ovens are constructed with refractory materials and heated to high temperatures exceeding 800° F. (427° C.), resulting in rapid and even baking of pizzas. The intense heat from the brick oven imparts a charred, crispy crust and a smoky flavor to the toppings, creating a sought-after culinary experience. Over time, brick oven pizzas have become synonymous with authenticity and quality, inspiring a resurgence in popularity and innovation in both commercial pizzerias and home kitchens.

SUMMARY

An oven support sliding assembly has a fixed lower structure and a sliding upper structure. The sliding upper structure supports an oven and slides along the fixed lower structure. The fixed lower structure attaches to a truck bed. For example, the oven is bolted to the sliding upper structure and the fixed lower structure is bolted to the truck bed. The assembly allows an oven to be easily stored within a vehicle while protected from an external environment and allows the oven to slide out of the vehicle during use. In one embodiment, the sliding upper structure has an upper frame and oven mounting holes, and the fixed lower structure has a lower frame, truck mounting holes, and a lower crossbar. The upper lateral track surfaces slide along the lower lateral track surfaces in a parallel fashion. A handle, release lever, and locking mechanism secure the assembly in various states.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
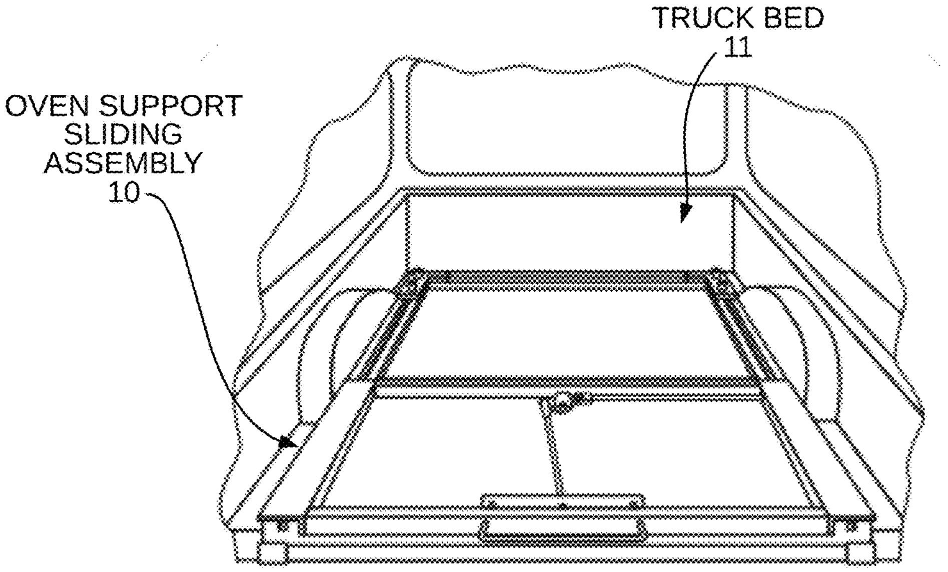
FIG. 1 is a diagram of an oven support sliding assembly mounted on a truck bed in accordance with one embodiment.

FIG. 1 is a diagram of an oven support sliding assembly 10 mounted on a truck bed 11 in accordance with one embodiment. The oven support sliding assembly 10 is mounted on the truck bed 11 and supports an oven 12 (shown in FIG. 2). The oven support sliding assembly 10 is installable on any vehicle having a sufficient open surface to support the oven support sliding assembly 10. The oven support sliding assembly 10 allows a truck 13 (shown in FIG. 2) to provide a mobile oven operation.

Figure 2:
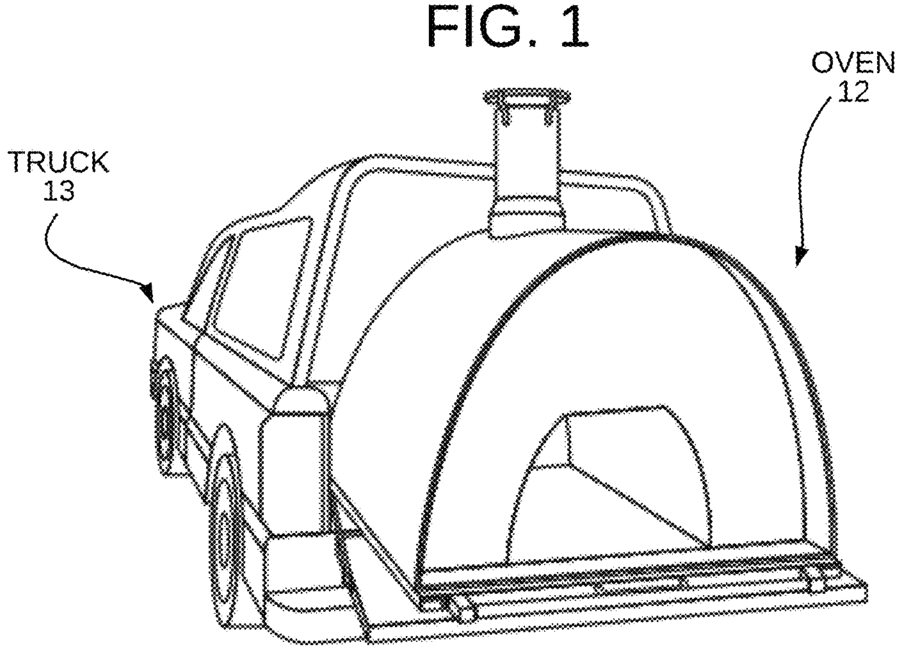
FIG. 2 is a diagram of a perspective view of an oven mounted onto the oven support sliding assembly.

FIG. 2 is a diagram of a perspective view of an oven 12 mounted on oven support sliding assembly 10. The oven 12 is slidable in and out of the truck bed 12 via the oven support sliding assembly 10.

Figure 3:
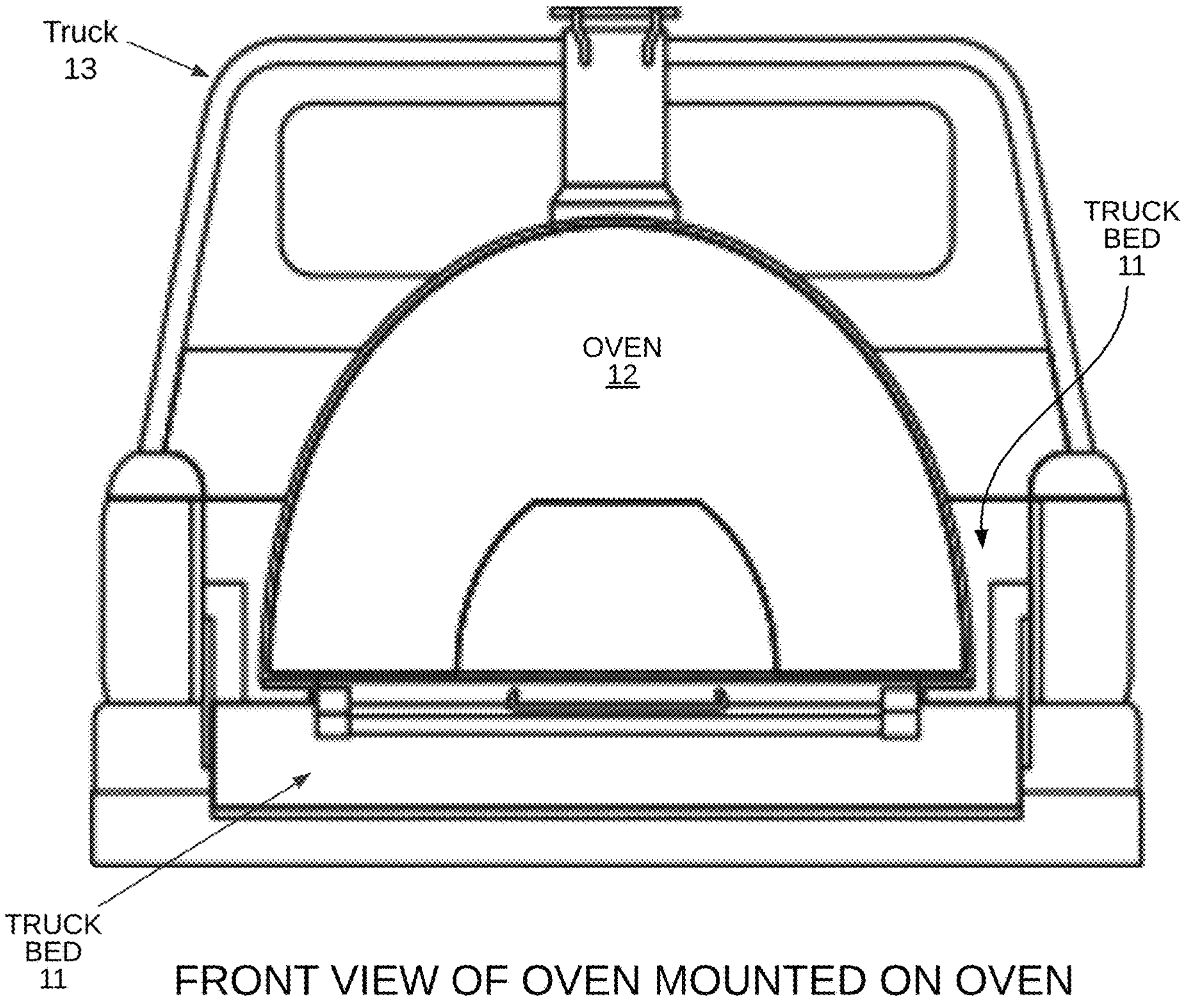
FIG. 3 is a diagram of a front view of an oven mounted onto the oven support sliding assembly.

FIG. 3 is a diagram of a front view of the oven 12 mounted on oven support sliding assembly 10.

Figure 4:
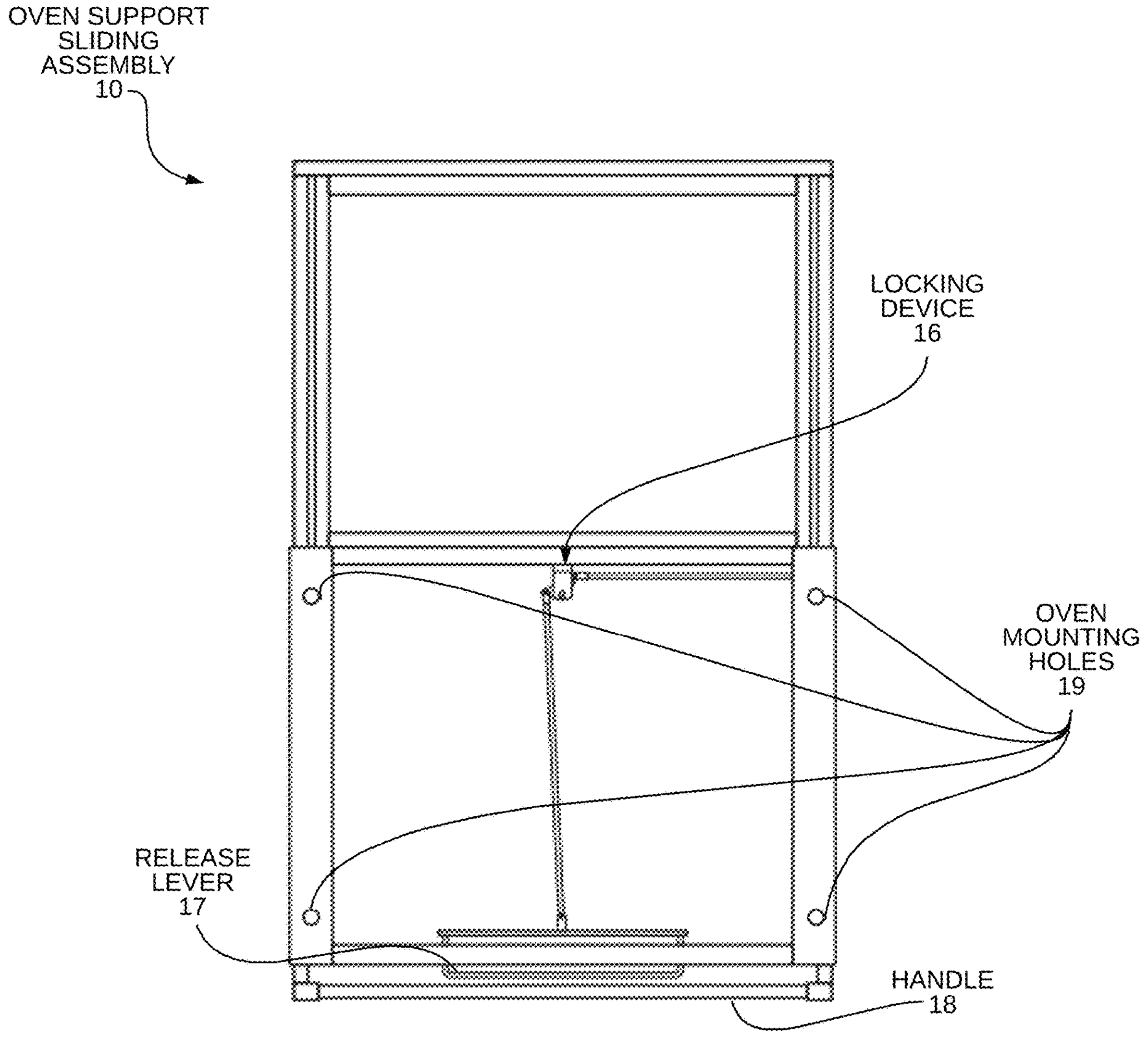
FIG. 4 is a diagram of a top view of the oven support sliding assembly fully retracted.

FIG. 4 is a diagram of a top view of oven support sliding assembly 10 fully retracted and compact state. The oven support sliding assembly 10 comprises a fixed lower structure 14 and sliding upper structure 15. The sliding assembly 10 is configured in the fully retracted state when the oven 12 is not being used and is being transported or stored in truck 13.

A lock device 16 maintains the oven support sliding assembly 10 in the retracted state while the truck 13 is moving or the oven 12 is being stored. The locking device 16 is activated by engaging a release lever 17 against a handle 18.

The fixed lower structure 14 includes oven mounting holes 19. The oven 12 is mounted onto the oven support sliding assembly 10 via the oven mounting holes 19.

Figure 5:
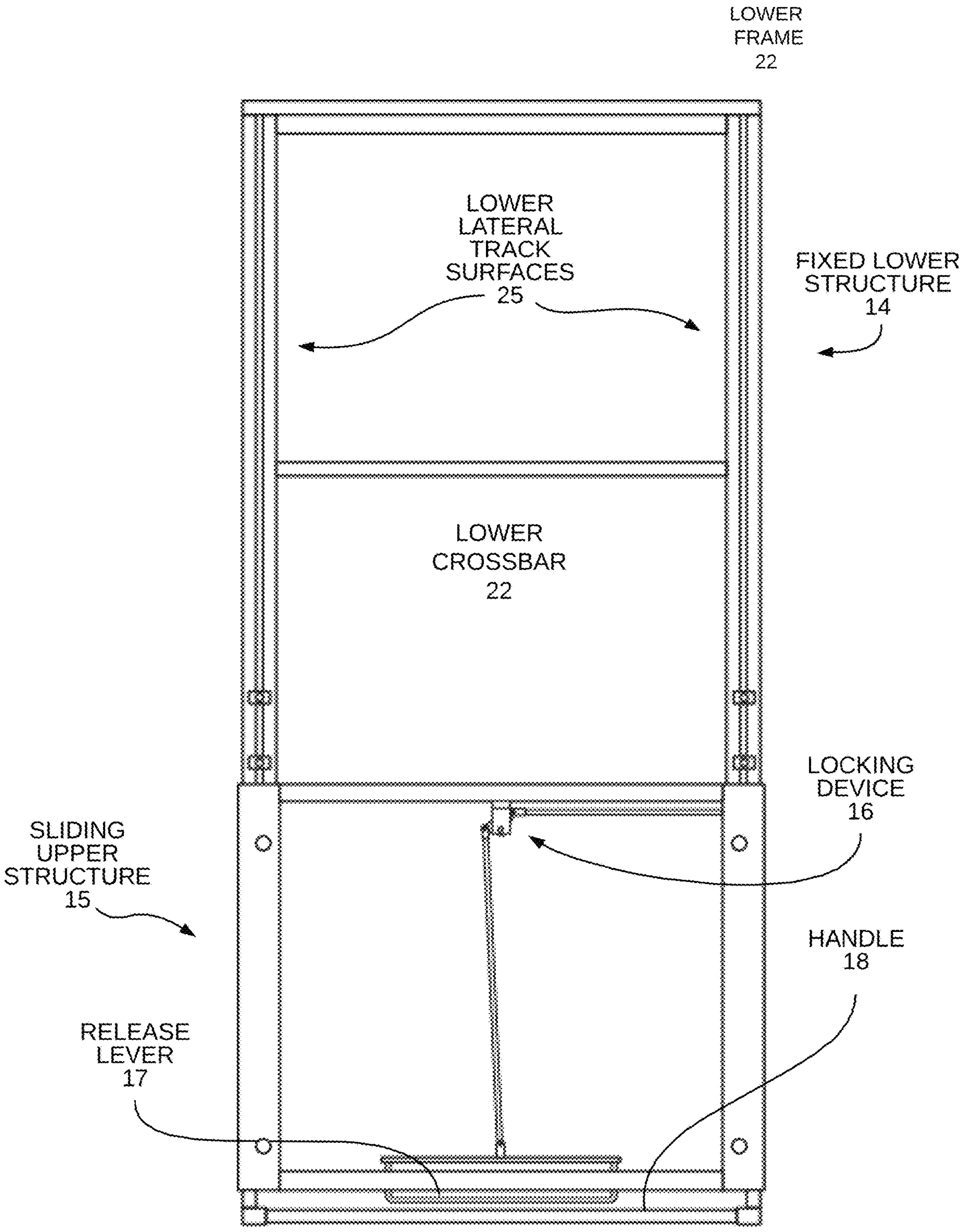
FIG. 5 is a diagram of the top view of the oven support sliding assembly while it is fully extended.

FIG. 5 is a diagram of the top view of the oven support sliding assembly 10 while it is fully extended. The oven support sliding assembly 10 comprises a fixed lower structure 14 and a sliding upper structure 15. In operation, the sliding assembly slides and extends laterally when activated by the release lever 17. The extension allows the oven 12 to be accessed from the outside/backside of truck 13.

The fixed lower structure 14 includes a lower frame 20, truck mounting holes 21, and a lower cross bar 22. The lower frame 20 has lower lateral track surfaces 25. The truck mounting holes 21 attach the fixed lower structure 14 to the truck bed 11. The lower cross bar 22 extends between the lower lateral track surfaces 25.

A locking device 16 releases the upper sliding upper structure 15. After releasing, an operator is able to configure the oven support sliding assembly 10 into the extended configuration by pulling on handle 18.

The sliding upper structure includes the upper frame 23, upper lateral track surfaces 24, locking device 16, and handle 18. The upper frame 23 has upper lateral track surfaces 24. The locking device 16 releases the sliding upper structure 15 from the fixed lower structure 14 when the release lever 17 is triggered. The handle 18 is utilized to slide the upper frame 23 from the fixed lower structure 14 once the release lever 17 is triggered.

Figure 6:
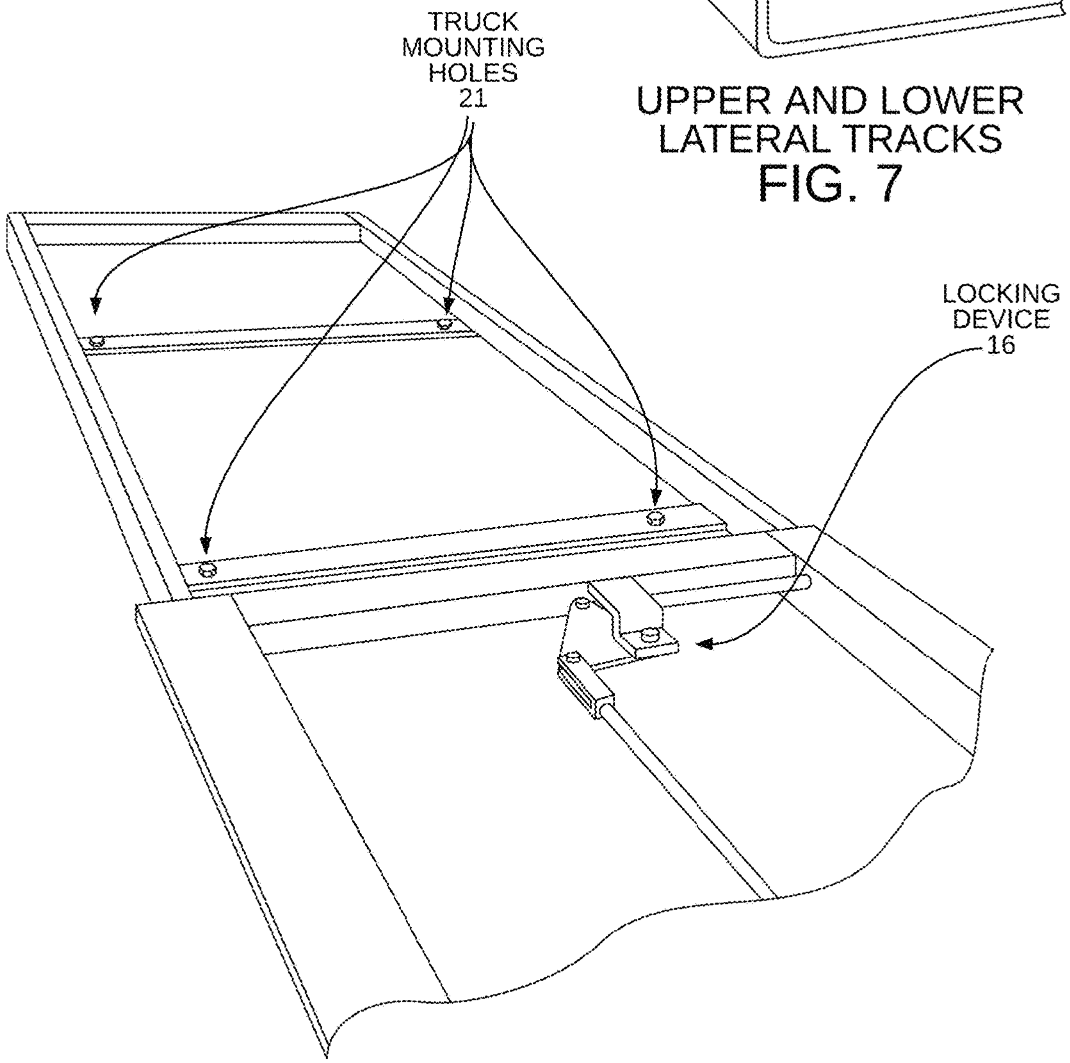
FIG. 6. is a perspective view of the oven support sliding assembly while it is fully extended.

FIG. 6. is a perspective view of the oven support sliding assembly 10 while it is fully extended. The fixed lower structure 14 includes a lower frame 20, truck mounting holes 21, and a lower cross bar 22. The lower frame 20 has lower lateral track surfaces 25. The truck mounting holes 21 attach the fixed lower structure 14 to the truck bed 11. The extended sliding upper structure 15 in this perspective view includes the upper frame 23, upper lateral track surfaces 24, and locking device 16. The locking device 16 is triggered thereby allowing the sliding upper structure 15 to extend away from the fixed lower structure 14.

Figure 7:
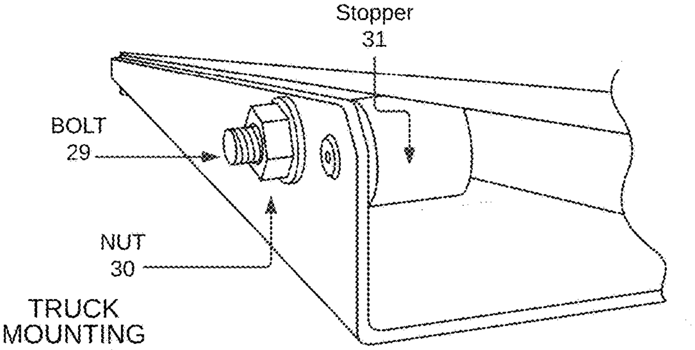
FIG. 7. is a perspective view of the bolt, nut, and stopper that secures the upper lateral track surfaces and the lower lateral track surfaces.

FIG. 7. is a perspective view of the bolt 29, nut 30, and stopper 31 that secures the upper lateral track surfaces 24, and the lower lateral track surfaces 25. In this embodiment, the plural rotating bearings 27 are on each side of the oven support sliding assembly 10 to enable the extension of the upper sliding upper structure 15 from the lower sliding structure 14. In this embodiment, the welded safety stopper 28 is configured to the sliding upper structure 15 and keeps the sliding upper structure 15 from sliding off the fixed lower structure 14 when fully extended. In another embodiment, the rotating bearing 27 is adjacent to the stopper 31 with the bolt 29 and nut 30 configured to the fixed lower structure 14.

Figure 8:
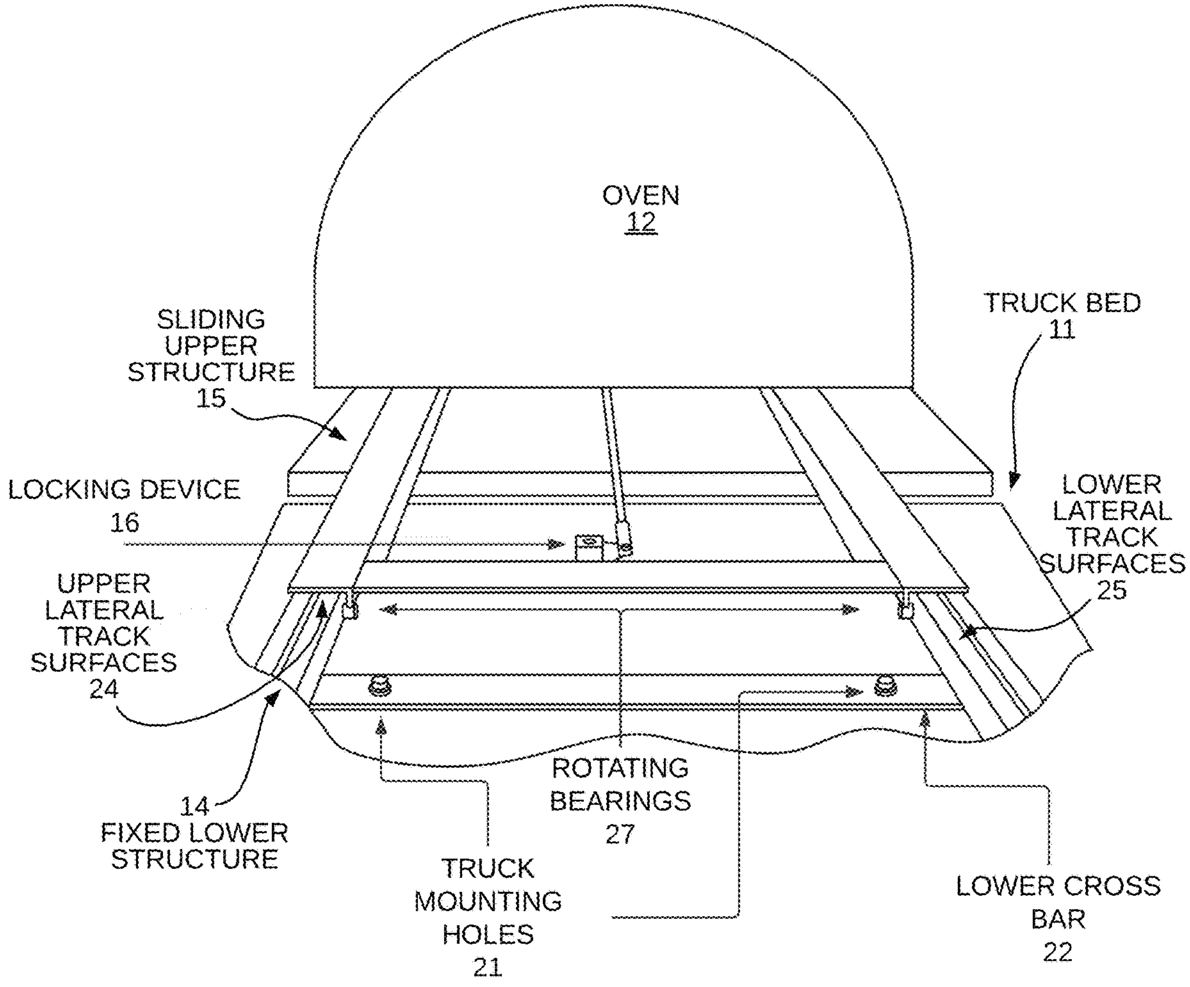
FIG. 8 is a diagram showing a rear view of the oven support sliding assembly fully extended.

FIG. 8 is a diagram showing a rear view of the oven support sliding assembly 10 fully extended. This rear view shows that the sliding upper structure 15 includes plural rotating bearings 27 on each side of the structure to slide the sliding upper structure 15 from the fixed lower structure 14.

Figure 9:
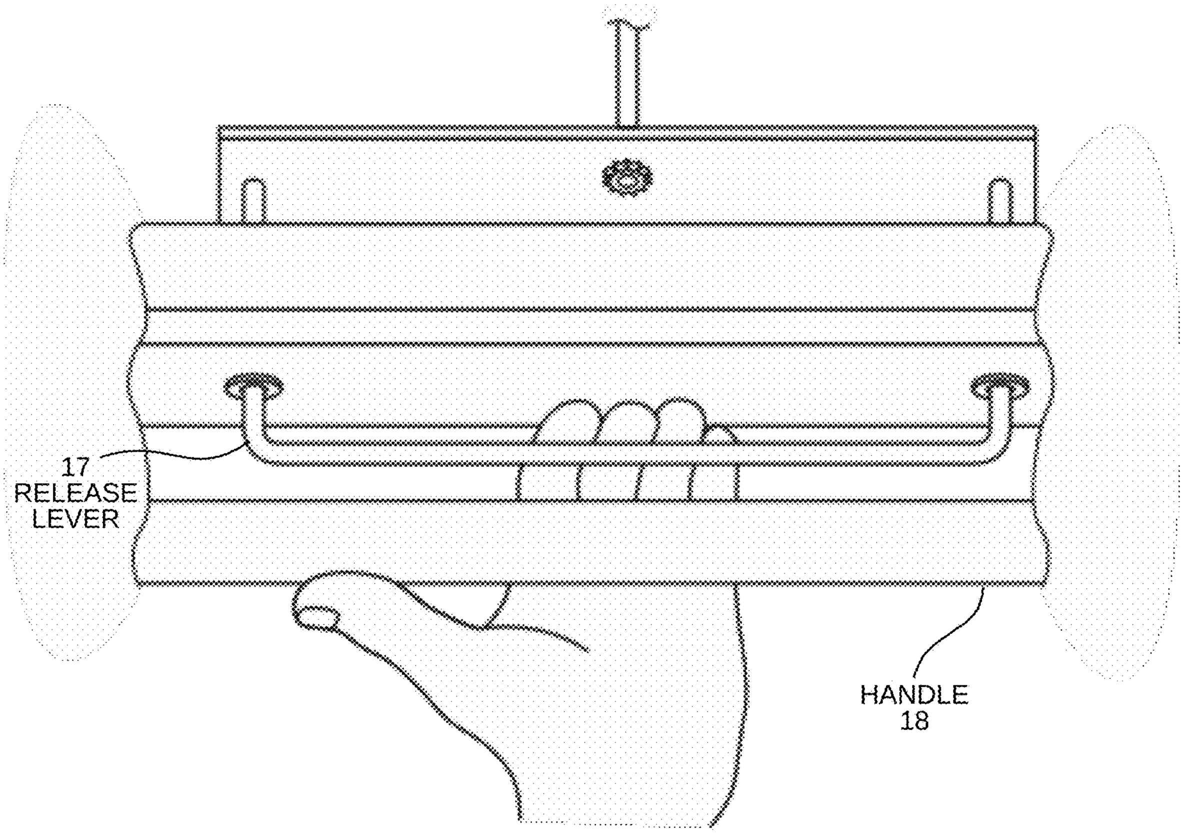
FIG. 9. is a perspective view of the release lever prior to operator activation. The view shows that activation of the release lever requires the operator to simultaneously engage the handle.

FIG. 9. is a perspective view of the release lever 17 prior to operator activation. The view shows that activation of the release lever 17 requires the operator to simultaneously engage the handle 18.

Figure 10:
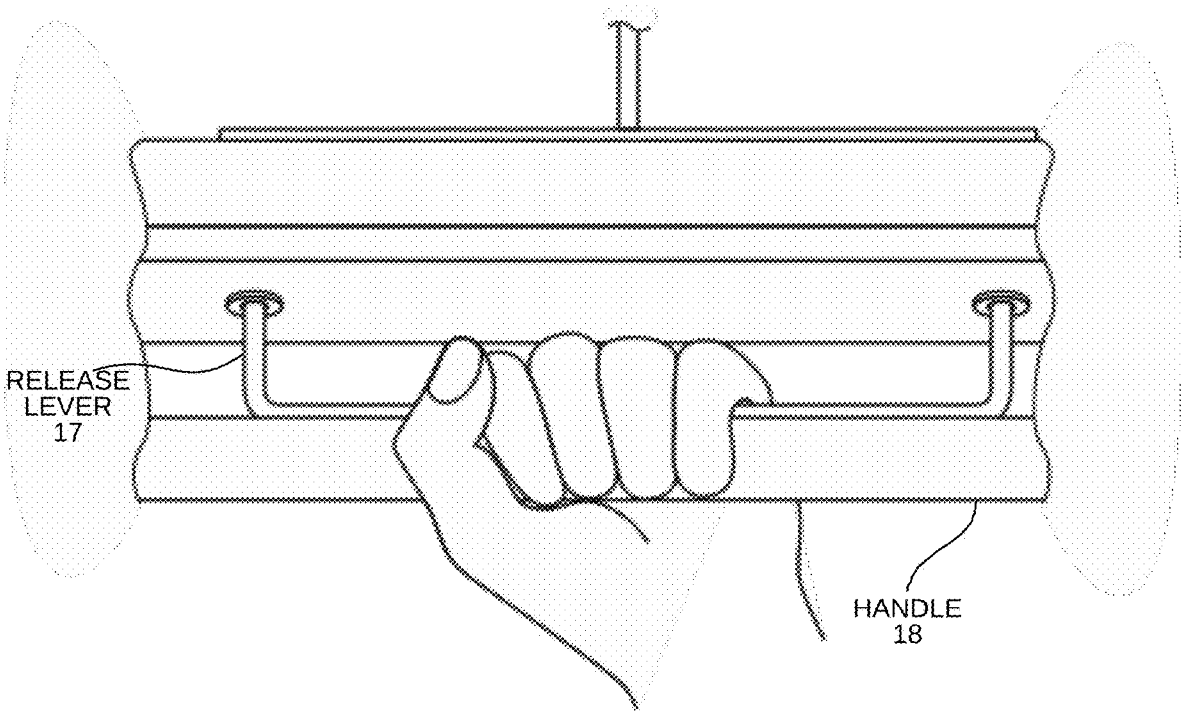
FIG. 10. is a perspective view of the release lever after operator activation.

FIG. 10. is a perspective view of the release lever 17 after operator activation. To activate, the operator must pull the release lever 17 towards the handle 18.

Figure 11:
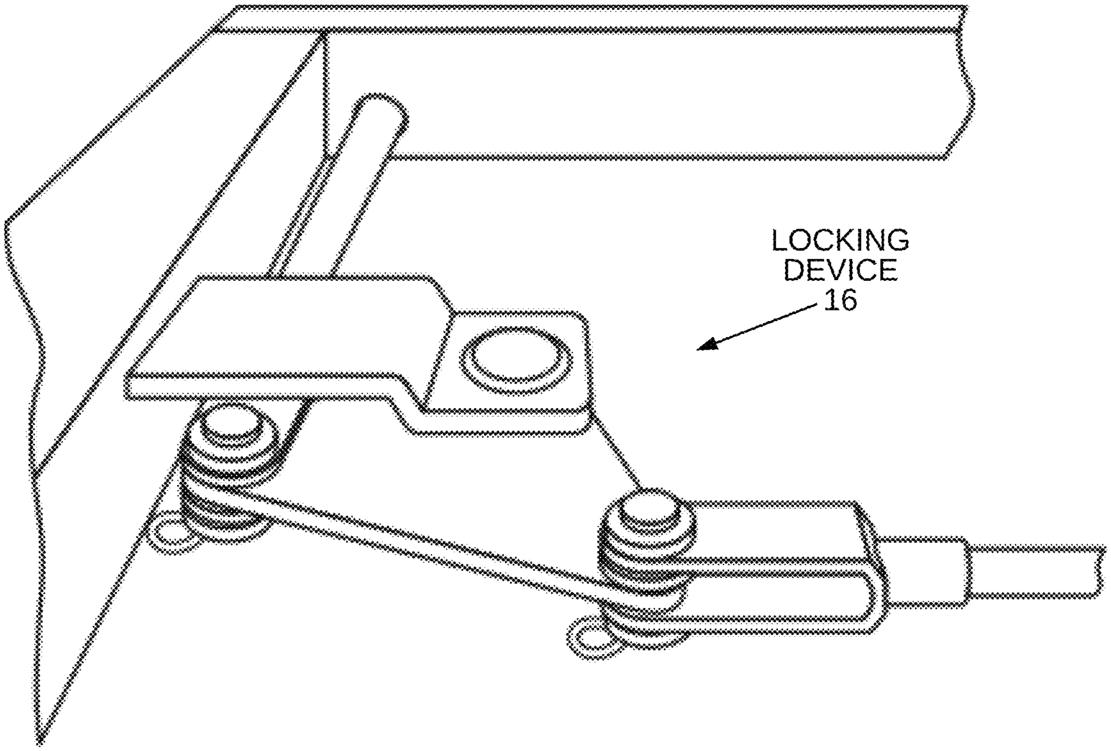
FIG. 11. is a diagram showing an expanded view of the locking device.

FIG. 11. is a diagram showing an expanded view of the locking device 16. The locking device 16 includes one or more suitable mechanical components used to secure the fixed lower structure 14 relative to the sliding upper structure 15.

Figure 12:
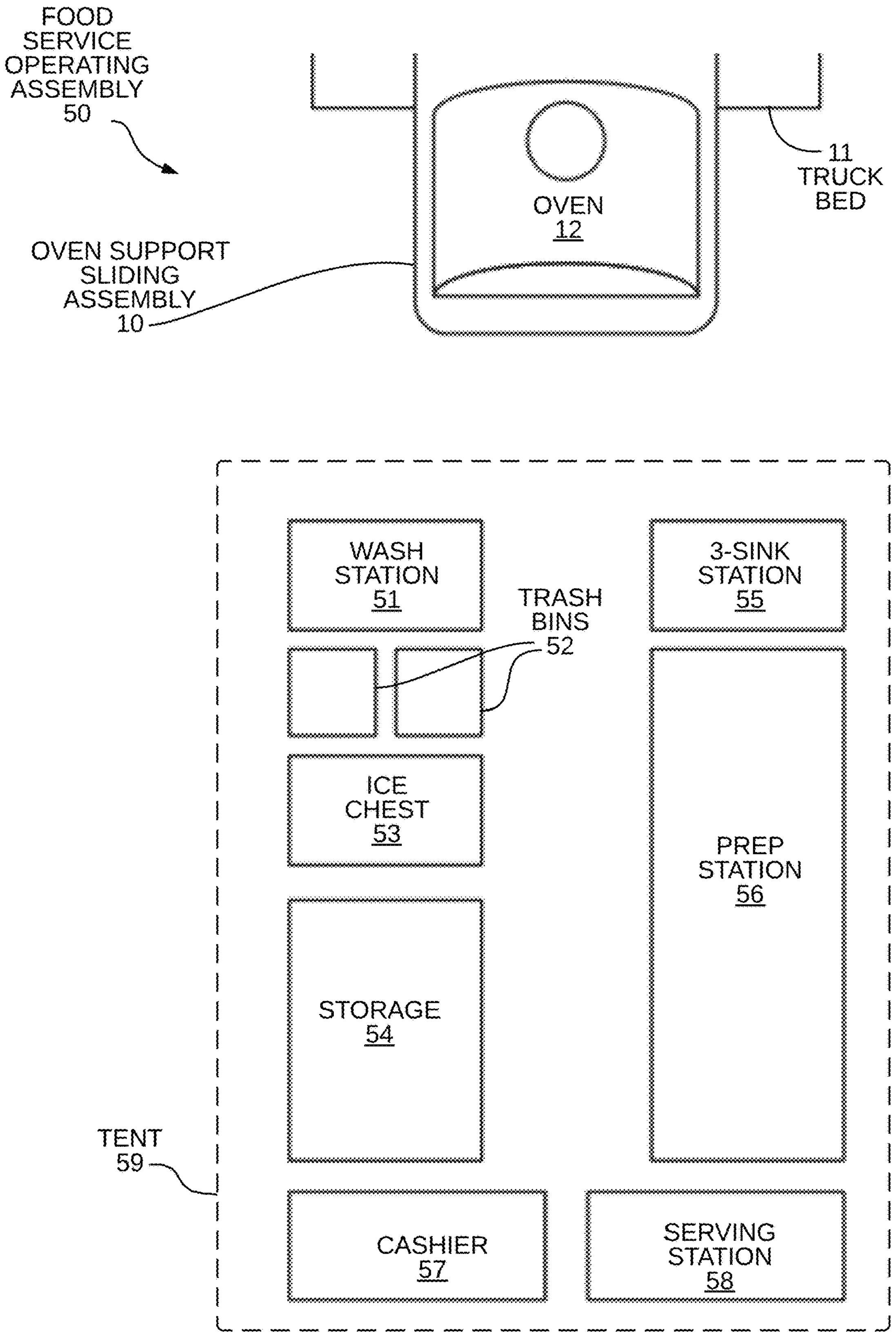
FIG. 12 is a high level block diagram of a food service operating assembly.

FIG. 12 is a high level block diagram of a food service operating assembly 50. The food service operating assembly 50 uses the oven support sliding assembly 10 to slide the oven 12 in and out of the truck bed 11. The food service operating assembly 50 includes a wash station 51, trash bins 52, ice chest 53, storage 54, three-sink station 55, preparation (prep) station 56, cashier 57, serving station 58, and tent 59. As shown in FIG. 12, the oven support sliding assembly 10 facilitates mobile operation of pizza and other food providing services requiring an oven.

Figure 13:
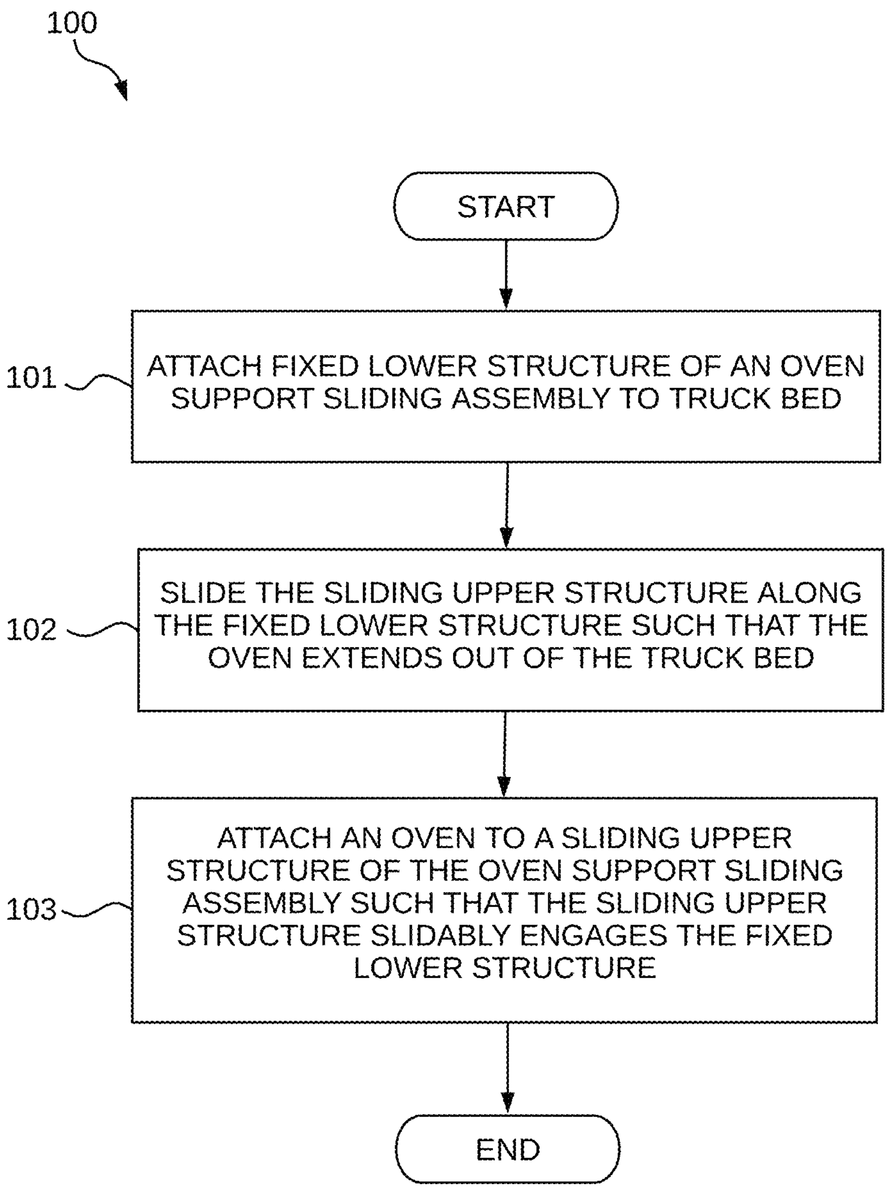
FIG. 13 is a flow chart of a method 100 in accordance with one novel aspect.

FIG. 13 is a flow chart of a method 100 in accordance with one novel aspect. The method 100 is a method of installing an oven support sliding assembly onto a truck bed and using the oven support sliding assembly to retract and extend an oven in and out of the truck bed.

In a first step (step 101), a fixed lower structure of an oven support sliding assembly is attached to a truck bed. For example, as shown in FIG. 8, the fixed lower structure 14 of the oven support sliding assembly 10 is attached to the truck bed 11.

In a second step (step 102), the sliding upper structure slides along the fixed lower structure such that the oven extends out of the truck bed. For example, as shown in FIG. 8, the sliding upper structure 15 slides along the fixed lower structure 14 such that the oven 12 extends out of the truck bed 11.

In a third step (step 103), an oven is attached to a sliding upper structure of the oven support sliding assembly such that the sliding upper structure slidably engages the fixed lower structure. For example, as shown in FIG. 8, the oven 12 is attached to a sliding upper structure 15 of the oven support sliding assembly 10 such that the sliding upper structure 15 slidably engages the fixed lower structure 14.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An oven support sliding assembly comprising:
- a fixed lower structure; and
- a sliding upper structure wherein the sliding upper structure slides along the fixed lower structure; and
- a locking device comprising a spring-loaded latch that engages the fixed lower structure, wherein the locking device is released by pulling a release lever toward a handle extending along an end of the sliding upper structure, and wherein the fixed lower structure is configured to attach to a truck bed.

2. The oven support sliding assembly of claim 1, wherein the sliding upper structure is configured to support an oven.

3. The oven support sliding assembly of claim 1, wherein the sliding upper structure comprises:
- an upper frame having upper lateral track surfaces; and
- oven mounting holes that attach an oven to the sliding upper structure.

4. The oven support sliding assembly of claim 1, wherein the fixed lower structure comprises:
- a lower frame having lower lateral track surfaces;
- truck mounting holes that attach the fixed lower structure to the truck bed; and
- a lower cross bar that extends between the lower lateral track surfaces.

5. The oven support sliding assembly of claim 1, wherein the handle extends along an end of the sliding upper structure.

6. A method comprising attaching an oven support sliding assembly to a truckbed, wherein the assembly comprises:
- a fixed lower structure;
- a sliding upper structure wherein the sliding upper structure slides along the fixed lower structure; and
- a locking device comprising a spring-loaded latch that engages the fixed lower structure, wherein the locking device is released by pulling a release lever toward a handle extending along an end of the sliding upper structure.

7. The method of claim 6, further comprising:
- sliding the sliding upper structure along the fixed lower structure such that the oven extends laterally out of the truck bed.

8. The method of claim 6, further comprising:

securing the sliding upper structure relative to the fixed lower structure using the locking device, wherein the locking device retracts and locks the sliding upper structure along the fixed lower structure.

9. The method of claim 6, further comprising:

using the release lever to trigger the locking device thereby releasing the sliding upper structure from the fixed lower structure and allowing the sliding upper structure to slide along lower lateral track surfaces of the fixed lower structure to a fully extended position.

10. The method of claim 6, further comprising:

preventing the sliding upper structure from sliding off of the fixed lower structure using a stopper.

11. The method of claim 6, wherein the sliding upper structure includes an upper frame and oven mounting holes.

12. The method of claim 6, wherein the fixed lower structure includes a lower frame, truck mounting holes, and a lower cross bar.

13. An oven support sliding assembly comprising:

a fixed lower structure having at least one lateral track surface, a lower cross bar, and truck mounting holes, wherein the truck mounting holes are configured to attach the fixed lower structure to a truck bed, and wherein the lower cross bar extends between the lower lateral track surfaces;

a sliding upper structure having at least one lateral track surface and oven mounting holes, wherein the lateral track surface of the upper structure is configured to slide along and above the lateral track surface of the lower structure, and wherein the oven mounting holes are configured to attach an oven to the sliding upper structure;

a locking device having a spring-loaded latch configured to engage the fixed lower structure; and a release lever, wherein the locking device is released by pulling the release lever toward a handle thereby releasing the locking device and allowing the sliding upper structure to slide along the lower lateral track surfaces of the fixed lower structure.

14. The oven support sliding assembly of claim 13, further comprising:

a stopper configured to prevent the sliding upper structure from sliding off of the fixed lower structure.

* * * * *